United States Patent [19]
Hollenbeck

[11] Patent Number: 5,935,367
[45] Date of Patent: Aug. 10, 1999

[54] APPARATUS AND METHOD FOR FORMING HANDLES IN PLASTIC BAGS

[75] Inventor: Robert E. Hollenbeck, Newark, N.Y.

[73] Assignee: Tenneco Packaging Inc., Lake Forest, Ill.

[21] Appl. No.: 08/763,741

[22] Filed: Dec. 11, 1996

[51] Int. Cl.$^6$ .............................. B32B 31/00; B26D 1/12
[52] U.S. Cl. ................... 156/252; 156/204; 156/267; 156/269; 156/290; 156/292; 156/308.4; 83/346; 83/659; 83/509; 383/8; 383/903; 493/196; 493/926
[58] Field of Search ........................ 83/659, 346, 509; 206/554; 383/8, 9, 903; 493/244, 196, 201, 230, 233, 238, 240, 341, 322, 362, 370, 371, 267, 926, 243; 156/204, 227, 251, 252, 256, 267, 269, 290, 292, 308.4

[56] References Cited

U.S. PATENT DOCUMENTS

| | | | |
|---|---|---|---|
| D. 297,113 | 8/1988 | Benoit | D9/305 |
| 4,326,664 | 4/1982 | Benoit et al. | 229/54 R |
| 4,346,834 | 8/1982 | Mazumdar | 229/54 R |
| 4,367,841 | 1/1983 | Mazumdar | 229/54 R |
| 4,464,157 | 8/1984 | Benoit et al. | 493/211 |
| 4,476,979 | 10/1984 | Reimann et al. | 206/554 |
| 4,493,419 | 1/1985 | Prader et al. | 206/554 |
| 4,554,192 | 11/1985 | Benoit | 428/35 |
| 4,560,067 | 12/1985 | Reimann | 206/554 |
| 4,571,235 | 2/1986 | Benoit | 493/195 |
| 4,588,392 | 5/1986 | Maddock | 493/200 |
| 4,604,927 | 8/1986 | Reimann | 83/55 |
| 4,613,988 | 9/1986 | Maddock | 383/8 |
| 4,652,253 | 3/1987 | Benoit | 493/195 |
| 4,655,737 | 4/1987 | Benoit | 493/194 |
| 4,656,900 | 4/1987 | Herrington | 83/24 |
| 4,720,872 | 1/1988 | Kaczerwaski | 383/8 |
| 4,744,200 | 5/1988 | Benoit, Jr. et al. | 53/447 |
| 4,783,856 | 11/1988 | Bouwens et al. | 2/87 |

(List continued on next page.)

FOREIGN PATENT DOCUMENTS

| | | |
|---|---|---|
| 7-285560 | 10/1995 | Japan . |
| WO96/38290 | 12/1996 | WIPO . |
| WO97/35711 | 10/1997 | WIPO . |

OTHER PUBLICATIONS

English abstract of JP 7–285560 From vol. 95, No. 10 in Patent Abstracts of Japan Unexamined Applications, Oct. 1995.
Description of Prior Art Blades shown in FIGS. 8, 9, and 13 of 08/763,741.

*Primary Examiner*—David A. Simmons
*Assistant Examiner*—Linda L. Gray
*Attorney, Agent, or Firm*—Arnold, White & Durkee

[57] ABSTRACT

An apparatus and method for forming specially-configured handles in a plurality of interconnected plastic bags traveling in a longitudinal direction. The plastic bags are interconnected along transverse lines of weakness spaced at bag-length distances apart. The apparatus and method comprise using a rotary anvil and a rotary cutting die. The rotary anvil has a first axis of rotation. The rotary cutting die is disposed adjacent to the rotary anvil and has a second axis of rotation substantially parallel to the first axis of rotation. The rotary cutting die includes a rotatable cylindrical shaft, a blade shell mounted on the shaft, and a generally W-shaped blade formed on the blade shell. The blade has a base portion and a pair of substantially linear opposing legs, and the base portion has an inverted, V-shaped configuration. The opposing legs extend upwardly relative to the base portion and outwardly relative to each other. The blade cuts and thereby forms a pair of handles in each of the plastic bags in response to passing the plastic bags between the rotary anvil and the rotary cutting die.

20 Claims, 9 Drawing Sheets

U.S. PATENT DOCUMENTS

| | | | |
|---|---|---|---|
| 4,785,938 | 11/1988 | Benoit, Jr. et al. | 206/554 |
| 4,790,437 | 12/1988 | Pistner | 206/554 |
| 4,804,564 | 2/1989 | Dobreski et al. | 428/35.5 |
| 4,812,055 | 3/1989 | Prader et al. | 383/119 |
| 4,816,104 | 3/1989 | Benoit | 156/204 |
| 4,819,806 | 4/1989 | Pistner | 206/554 |
| 4,840,610 | 6/1989 | Pistner | 493/194 |
| 4,883,450 | 11/1989 | Benoit | 493/196 |
| 4,911,560 | 3/1990 | Hoover et al. | 383/8 |
| 4,982,637 | 1/1991 | Osborn | 83/346 |
| 5,087,234 | 2/1992 | Prader et al. | 493/194 |
| 5,149,201 | 9/1992 | Benoit | 383/8 |
| 5,219,220 | 6/1993 | Kucera et al. | 383/120 |
| 5,333,730 | 8/1994 | Boyd | 206/554 |
| 5,507,713 | 4/1996 | Glod, Sr. et al. | 493/194 |
| 5,573,489 | 11/1996 | Letendre et al. | 493/194 |
| 5,611,627 | 3/1997 | Belias et al. | 383/37 |
| 5,683,340 | 11/1997 | Belias et al. | 493/195 |
| 5,826,475 | 10/1998 | Mysliwiec | 83/116 |

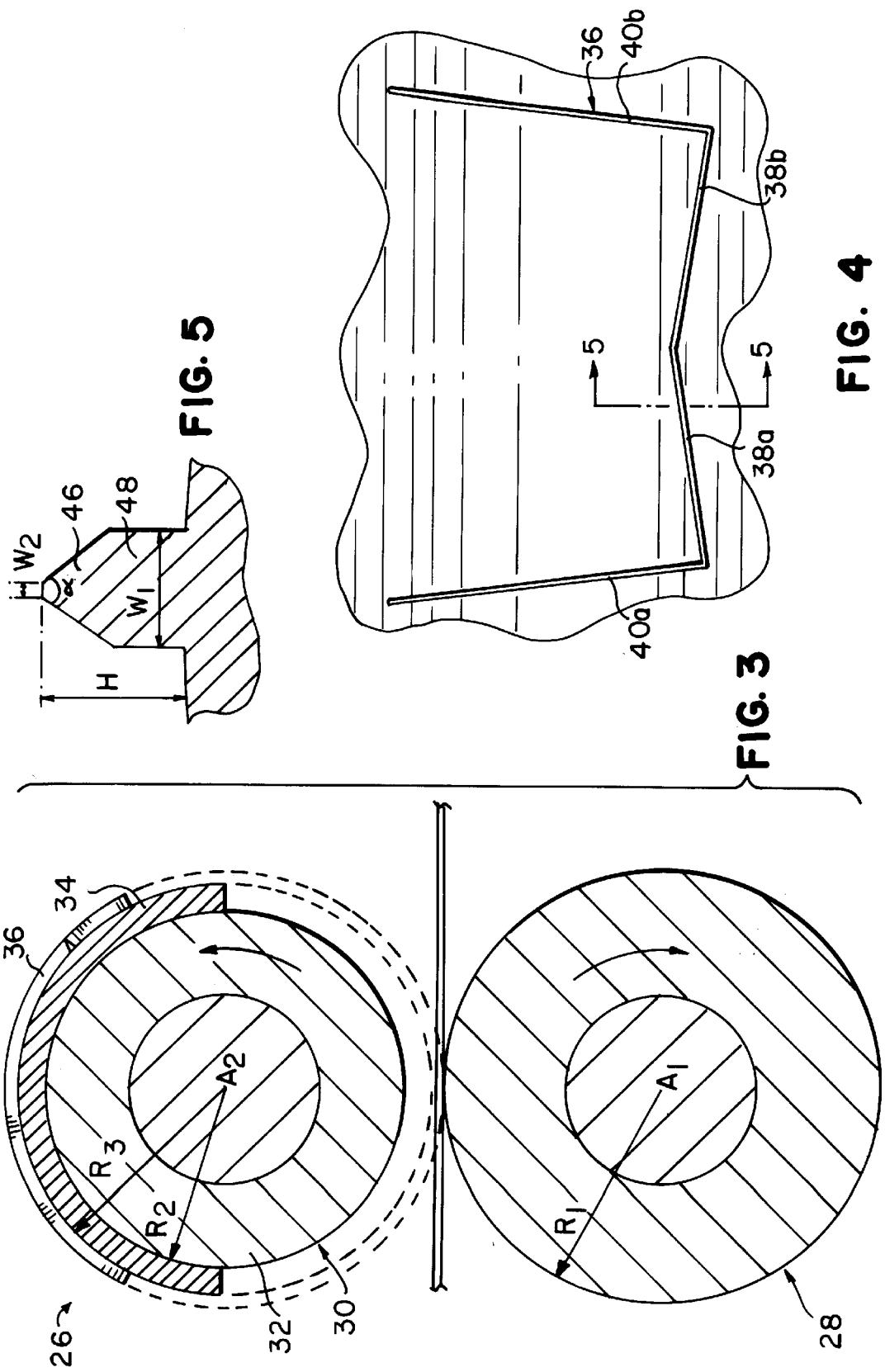

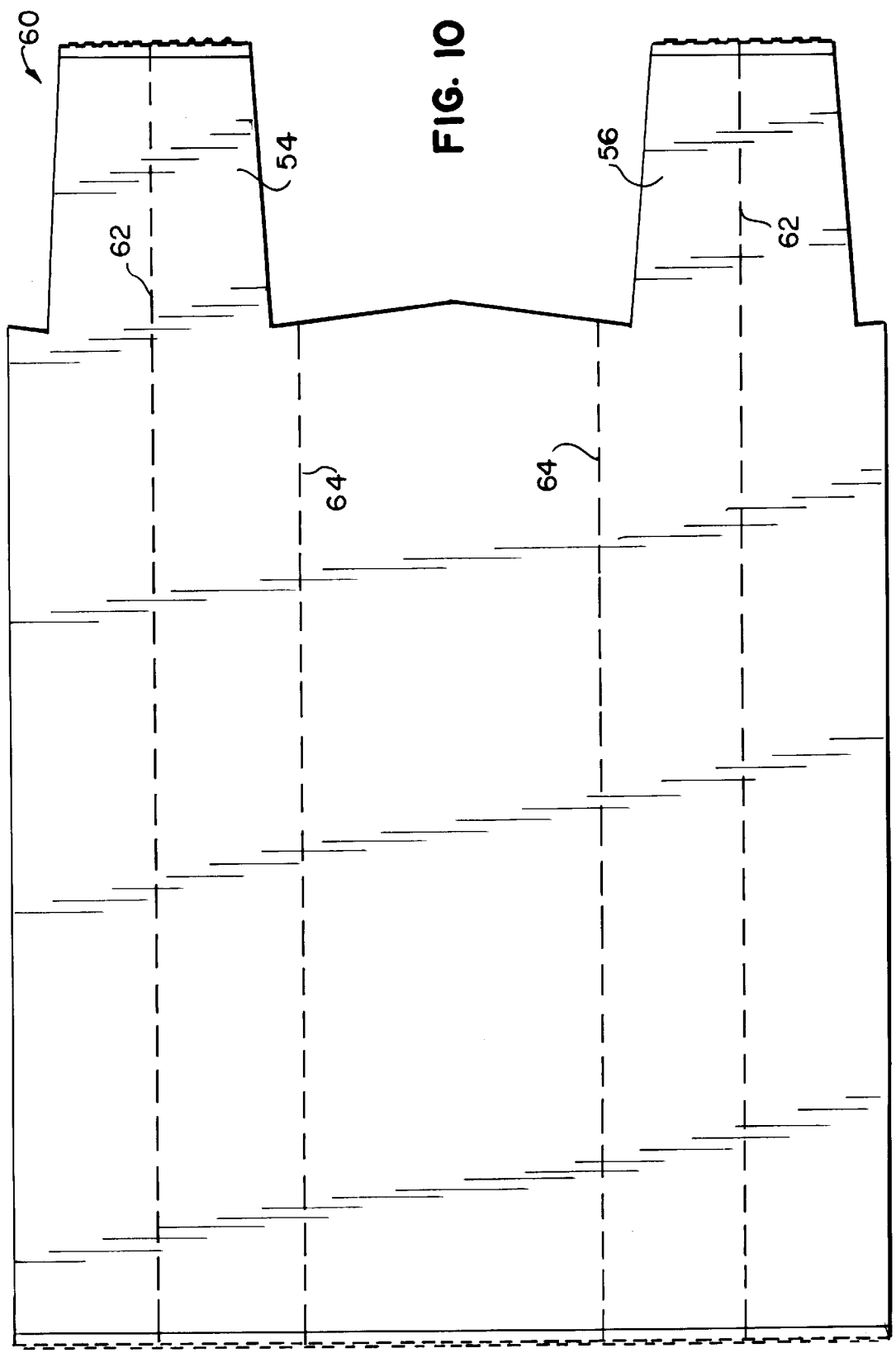

APPARATUS AND METHOD FOR FORMING HANDLES IN PLASTIC BAGS

FIELD OF THE INVENTION

The present invention relates generally to apparatus and methods for manufacturing plastic bags and, more particularly, relates to an apparatus and method utilizing a rotary cutting die having a generally W-shaped blade for forming the handles of a plastic bag.

BACKGROUND OF THE INVENTION

In one common method for manufacturing plastic bags, a collapsed tube of thermoplastic film is provided in a longitudinal/machine direction. The collapsed tube proceeds downstream to a heat sealing and perforation station, which forms pairs of closely-spaced, parallel transverse heat seals at bag-length distances apart and, in addition, forms transverse perforation lines between each of the pairs of transverse heat seals. After leaving the heat sealing and perforation station, the collapsed tube is in the form of a plurality of handleless bags (pillowcases) interconnected along the perforation lines. The interconnected handleless bags are optionally folded and then fed to a cutting station for the purpose of forming a pair of handles in each of the plastic bags.

An example of one such cutting station includes a rotary anvil and a rotary cutting die mounted parallel and adjacent to each other. The rotary cutting die includes a cylindrical shaft and a blade mounted to the shaft. As each of the interconnected handleless bags pass between the rotary anvil and the rotary cutting die, the blade of the rotating cutting die contacts and cuts through the plastic material of each bag, thereby creating an incision in the bag.

One of the major components of cost in manufacturing plastic bags is the lower production speed associated with the aforementioned cutting station. The speed limitation in the cutting process pertains to the blade design of the rotary cutting die. A blade design that only cuts in the machine direction (i.e. direction of bag movement) has no speed limitations, while a blade design that cuts in both the longitudinal direction and transverse direction has a speed limitation directly related to practical blade life. The formation of plastic bags with handles requires a blade design that cuts in both the longitudinal direction and transverse direction.

Heretofore, the blade of the rotary cutting die has traditionally been shaped in the form of a U as shown in FIG. 8. The U-shaped blade creates an incision having a corresponding shape. When the incision is U-shaped, the legs of the U are along the handles of the bag and the base portion of the U is along the mouth of the bag. In the rotary die cutting process performed at the cutting station, the direction of the cut is from the bottom of the U to the top of the U, or vice versa.

During the cutting process, the blade of the rotary cutting die interferes with the adjacent rotary anvil. This interference can be measured as a force. During a single rotational cycle of the blade, the interference/contact force changes in relation to an area of the blade contacting the rotary anvil at a given time. The greater the area of the blade contacting the rotary anvil at a given time, the greater the interference force. The interference force must be sufficiently high throughout the entire cutting process to allow the blade to render a complete incision (i.e. cut fully through the plastic material of the bag). The interference force is at a maximum when the greatest area of the blade is contacting the rotary anvil.

A drawback of the prior art U-shaped blade design is that the difference between the maximum and minimum interference force during a single cutting cycle of the blade is quite large. This difference is depicted in FIG. 8, which schematically illustrates a U-shaped blade alongside a graph showing the variation in interference force between the blade and an adjacent rotary anvil. The machine direction is represented in FIG. 8 by an arrow labeled L, while the transverse direction is represented by an arrow labeled T. As a plastic bag travels in the machine direction L between the rotary anvil and the blade of the rotary cutting die, the interference force at a certain moment in time is directly proportional to the area of the blade contacting the rotary anvil. The area of the blade contacting the rotary anvil at a certain moment in time may be approximated by the area of intersection of a transverse line and the blade in FIG. 8.

While the blade is forming the base portion of the U-shaped incision, the area of the blade contacting the rotary anvil increases to a large peak and, therefore, the interference force increases to a peak of approximately 3600 pounds. This maximum interference force is required in order for the blade to render a complete incision. In contrast, while the blade is forming the legs of the U-shaped incision, the area of the blade contacting the rotary anvil at a certain moment in time is quite small and, therefore, the interference force is close to zero pounds. Like the U-shaped blade design, another prior art blade design schematically illustrated in FIG. 9 suffers from a large difference between the maximum interference force (approximately 1200 pounds) and the minimum interference force (close to zero pounds).

Unfortunately, in the prior art blade designs in FIGS. 8 and 9, parts of the blade of the rotary cutting die cannot effectively withstand the maximum interference force and are therefore worn down and eventually destroyed. This phenomenon sets specific limits on the practical processing speeds, particularly in the manufacture of handled plastic bags.

Another drawback of the U-shaped blade design in FIG. 8 is that it shortens the effective life of the rotary anvil. The legs of the U-shaped blade are perpendicular to the base portion, thereby causing a groove in the adjacent rotary anvil as the cutting process progresses.

A further drawback of the prior art blade design depicted in FIGS. 9 and 13 is that the plastic bag produced thereby is susceptible to tearing in the handle region. When the plastic bag is loaded with a product and then carried by its handles, the handles are stressed in a manner represented by the stress lines 80 in FIG. 13. These stress lines originate from the upper ends of the handles and diverge as they travel downward through the handles. The stress lines are such that the outermost ones 80a and 80b thereof are not confined to the handles, but rather leave the handles temporarily at points 82 and 84 before re-entering the handles near the lowermost ends thereof. This phenomenon of the outermost stress lines not being confined to the handles makes the handles somewhat susceptible to tearing along tear lines 86, which extend between the points 82 and 84.

A need therefore exists for an apparatus and method for forming handles in plastic bags which employs a blade design that reduces the difference between the maximum and minimum interference force between the blade and rotary anvil, that extends the effective life of the rotary anvil, and that renders the plastic bag produced thereby less susceptible to tearing in the handle region.

SUMMARY OF THE INVENTION

In accordance with one aspect of the present invention, an apparatus is used to form specially-configured handles in a plurality of interconnected plastic bags traveling in a longitudinal direction. The plastic bags are interconnected along transverse lines of weakness spaced at bag-length distances apart. The apparatus comprises a rotary anvil and a rotary cutting die. The rotary anvil has a first axis of rotation. The rotary cutting die is disposed adjacent to the rotary anvil and has a second axis of rotation substantially parallel to the first axis of rotation. The rotary cutting die includes a rotatable cylindrical shaft, a blade shell mounted on the shaft, and a generally W-shaped blade formed on the blade shell. The blade has a base portion and a pair of opposing legs. The opposing legs extend upwardly relative to the base portion and outwardly relative to each other. The blade cuts and thereby forms a pair of handles in each of the plastic bags in response to passing the plastic bags between the rotary anvil and the rotary cutting die.

In accordance with another aspect of the present invention, a method utilizes the foregoing rotary anvil and rotary cutting die to form the handles in a plurality of interconnected plastic bags.

BRIEF DESCRIPTION OF THE DRAWINGS

Other objects and advantages of the invention will become apparent upon reading the following detailed description and upon reference to the drawings in which:

FIG. 3 is a section taken generally along line 3—3 in FIG. 2;

FIG. 4 is an enlarged plan view of a blade of a rotary die of the apparatus in FIG. 2;

FIG. 5 is a section taken generally along line 5—5 in FIG. 4;

FIG. 10 is a plan view, in schematic form, of a plastic bag manufactured by the system in FIG. 1;

Figure 1:
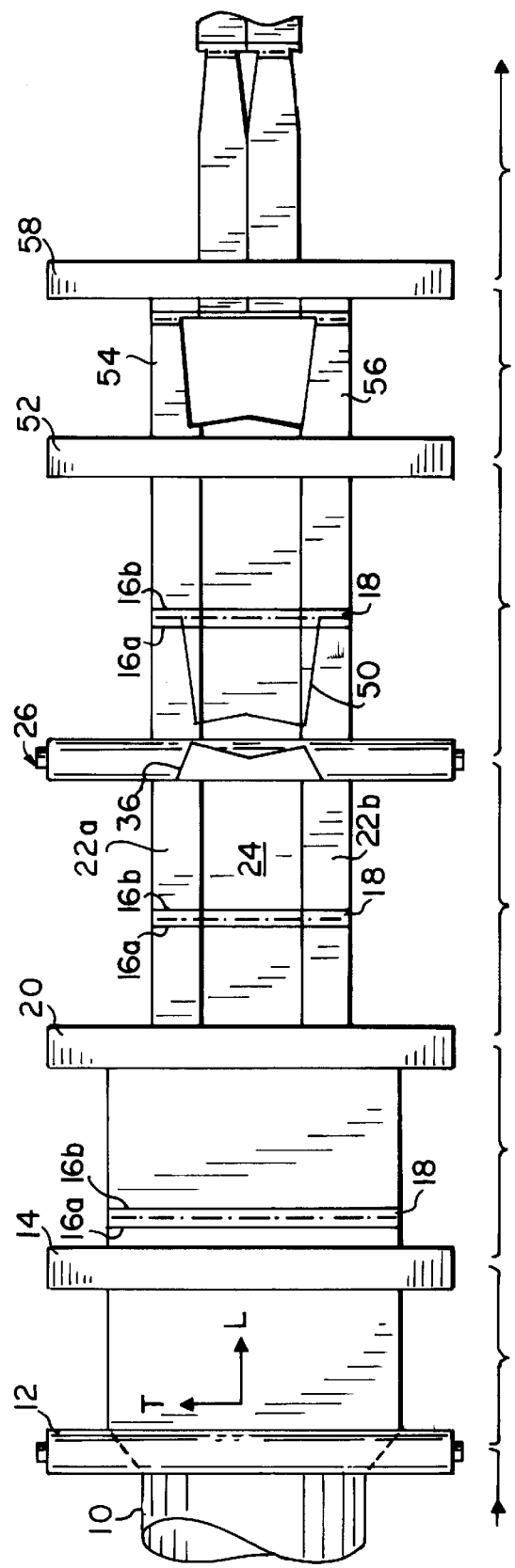
FIG. 1 is a plan view, in schematic form, of a system for forming a plurality of interconnected plastic bags.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, FIG. 1 depicts a system and process sequence for forming a plurality of interconnected plastic bags. A tube 10 of thermoplastic film is provided to the system in a longitudinal direction L. The film is preferably composed of high-density polyethylene, low-density polyethylene, linear low-density polyethylene, or blends of the foregoing. The thickness of the film may range from about 0.4 mils to about 2 mils, depending on the composition of the material used to form the bags and the intended use of the bags.

After collapsing the tube 10 at a collapsing station 12, the collapsed tube 10 proceeds downstream to a heat sealing and perforation station 14. The heat sealing and perforation station 14 forms pairs of closely-spaced, parallel transverse heat seals 16a and 16b at bag-length distances apart. One of the heat seals 16a and 16b forms the sealed bottom of one bag, while the other of the heat seals 16a and 16b insures that bag handles formed downstream from the station 14 are properly sealed at their upper ends. In the illustrated embodiment, the heat seal 16b forms the sealed bottom, while the heat seal 16a forms the sealed upper ends of the handles.

Simultaneously with the heat sealing or after forming the heat seals 16a and 16b, the station 14 forms transverse lines of weakness 18 between each of the pairs of transverse heat seals 16a and 16b such that the collapsed tube 10 includes a plurality of handleless bags (pillowcases) interconnected along the transverse lines of weakness 18. The transverse lines of weakness 18 may be in the form of perforation lines or lines of reduced thickness.

Figure 2:
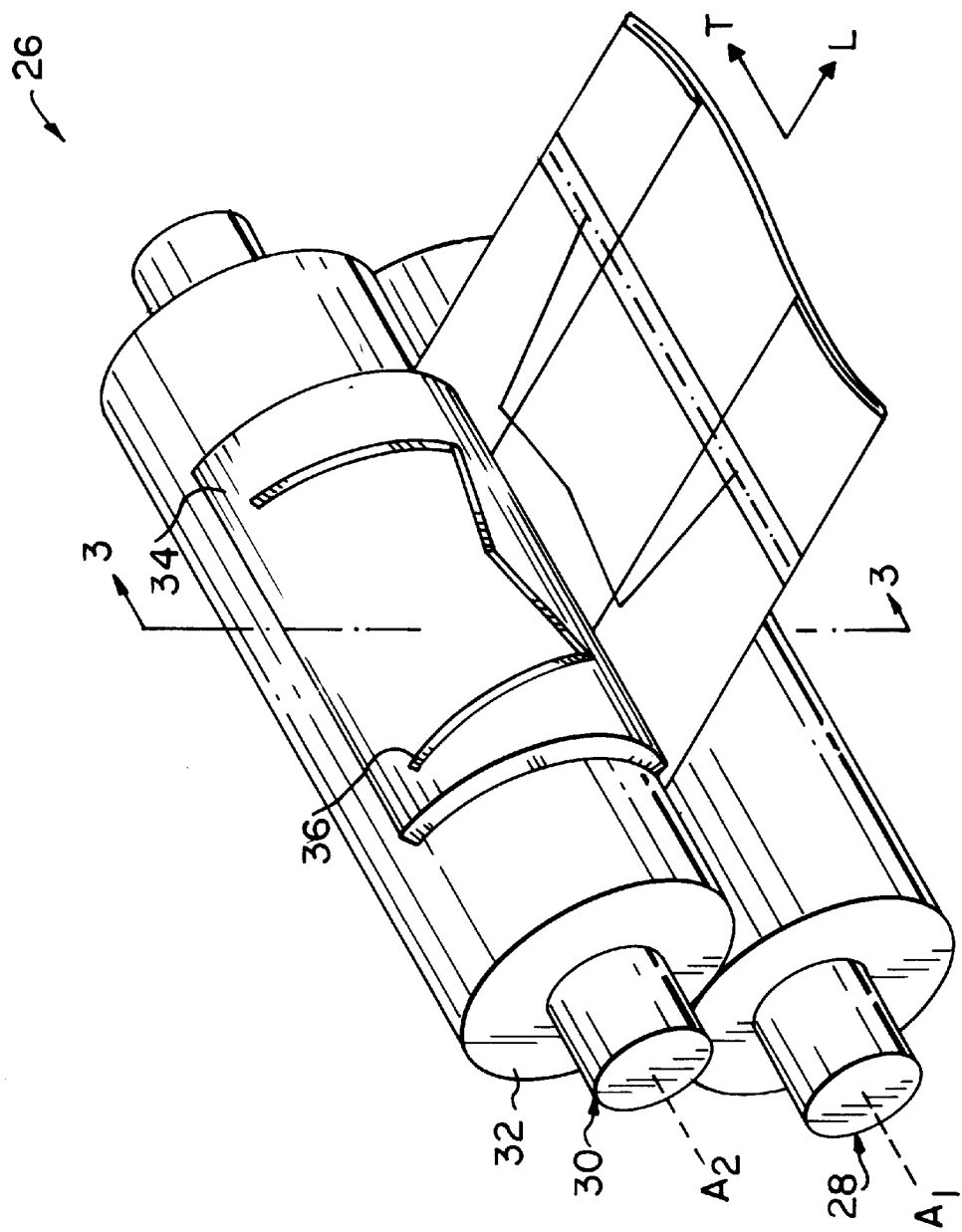
FIG. 2 is an isometric view of an apparatus employed in the system in FIG. 1 and used for forming a pair of handles in each of the plastic bags.

Next, the heat-sealed and perforated tube 10 proceeds downstream to a first folding station 20, which inwardly folds opposing side sections 22a and 22b of the tube 10. The tube 10 includes the pair of opposing side sections 22a and 22b and a central section 24 extending between the side sections 22a and 22b. The side section 22a is folded inward approximately 180 degrees relative to the central section 24, and, similarly, the side section 22b is folded inward approximately 180 degrees relative to the central section 24. As best shown in FIG. 2, the portion of the tube 10 including the folded side sections 22a and 22b and the underlying portions of the central section 24 is comprised of four layers of plastic material, while the portion of the tube 10 between the folded side sections 22a and 22b is comprised of two layers of plastic material.

The once-folded tube 10 then proceeds downstream to a cutting station 26, which forms a pair of handles in each of the interconnected bags of the tube 10. The construction of the cutting station 26 is described in detail below with reference to FIGS. 2–5.

Referring first to FIGS. 2 and 3, the cutting station 26 is comprised of a rotary anvil 28 and a rotary cutting die 30. The rotary anvil 28 has a first axis $A_1$ of rotation, while the rotary cutting die 30 has a second axis $A_2$ of rotation parallel to the first axis of rotation $A_1$. As indicated by the arrows in FIG. 3, the rotary anvil 28 rotates in a counterclockwise direction about the first axis $A_1$ of rotation, while the rotary cutting die 30 rotates in a clockwise direction about the second axis $A_2$ of rotation. The rotary cutting die 30 is disposed adjacent to the rotary anvil 28 and includes a rotatable cylindrical shaft 32, a blade shell 34 mounted on the shaft 32, and a generally W-shaped blade 36 formed on the blade shell 34. The shaft 32, the blade shell 34, and the blade 36 are preferably composed of hard steel. The blade shell 34 and the blade 36, in particular, are preferably composed of D2 tool steel.

The blade shell 34 may be mounted to the shaft 32 by conventional fastening means such as screws, bolts, or the like. As best shown in FIG. 3, the blade shell 34 extends approximately 180 degrees about the shaft 32 such that the blade shell 34 only partially encompasses the shaft 32. The W-shaped blade 36 is integrally formed with the blade shell 34 by machining away an outer portion of the blade shell 34 until only the blade 36 remains.

Referring to FIG. 4, the W-shaped blade 36 is formed by four linear segments 40*a*, 38*a*, 38*b*, and 40*b* connected directly to each other in the foregoing sequence. The segments 38*a* and 38*b* form a base portion of the blade 36, while the segments 40*a* and 40*b* form a pair of opposing legs of the blade 36. The base portion 38*a–b* is shaped in the form of an inverted "V". The opposing legs 40*a–b* extend upwardly relative to the base portion 38*a–b* and outwardly relative to each other. In an alternative embodiment shown schematically in FIG. 7, the legs 40*a*' and 40*b*' of the rounded W-shaped blade 36' are connected to the respective segments 38*a*' and 38*b*' of the base portion by the respective curved transition segments 42 and 44.

Referring to FIG. 5, the blade 36 has a cross-section including a trapezoidally-shaped upper portion 46 and a rectangularly-shaped lower portion 48. The upper end of the upper portion 46 is sufficiently narrow to allow the blade 36 to completely cut through the plastic bags as they pass between the rotary anvil 28 and the rotary cutting die 30 depicted in FIGS. 2 and 3.

Although the dimensions of the various elements of the cutting station 26 can be varied, these elements have the following dimensions in the preferred embodiment. Referring to FIG. 3, the anvil 28 has a radius $R_1$ of approximately 2.50 inches; the shaft 32 of the rotary cutting die 30 has a radius $R_2$ of approximately 1.50 inches; and the blade shell has a radius $R_3$ of approximately 2.25 inches. Referring to FIG. 5, the blade 36 has a height H of approximately 0.25 inches. The rectangularly-shaped lower portion 48 of the blade 36 has a width $W_1$ of approximately 0.25 inches, and the upper end of the trapezoidally-shaped upper portion 46 of the blade 36 has a width $W_2$ of approximately 0.002 inches. The width $W_2$ may be varied in accordance with the desired sharpness of the blade 36. The slopes of the angled surfaces of the upper portion 46 may be varied such that the inclusive angle $\alpha$ is in the range between about 30 degrees and about 90 degrees.

Referring back to FIG. 1, the cutting station 26 cuts each of the plastic bags as they pass between the rotary anvil 28 and the rotary cutting die 30. The radii of the rotary anvil 28 and the rotary cutting die 30 are selected such that a single rotation of these elements corresponds to movement of the collapsed tube 10 in the longitudinal direction L for a single bag-length distance. Also, the cutting station 26 is longitudinally positioned such that the blade 36 cuts a W-shaped incision 50 in each of the plastic bags in the illustrated position.

More specifically, the W-shaped incision 50 extends completely through the material of the associated plastic bag. The legs of the W-shaped incision 50 are located along the respective folded side sections 22*a* and 22*b* and the respective underlying portions of the central section 24. Most of the base portion of the W-shaped incision 50 is located along the central section 24 between the folded side sections 22*a* and 22*b*. The opposing ends of the base portion of the W-shaped incision 50 intersect the respective folded side sections 22*a* and 22*b* and the respective underlying portions of the central section 24. The legs of the W-shaped incision 50 cross the heat seal 16*a* and intersect the line of weakness 18 at two corresponding points of intersection.

After the cutting station 26 forms the W-shaped incision 50 in each of the plastic bags, each plastic bag proceeds downstream to a punching station 52 that punches out the W-shaped cutout section encompassed by the W-shaped incision 50 and the line of weakness 18. To punch out the cutout section, the punching station 52 may employ a reciprocating mechanical element or a cyclically-operated pneumatic element. Removing the cutout section of each plastic bag provides the bag with a pair of handles 54 and 56 that are more readily apparent in the unfolded plastic bag schematically shown in FIG. 10. To facilitate removal of the plastic material encompassed by the W-shaped incision 50 and the line of weakness 18, the line of weakness 18 is preferably created by the heat sealing and perforation station 14 such that the line of weakness 18 is substantially weaker between the two points at which the incision 50 intersects the line of weakness 18 than outside these two points of intersection.

The processed plastic tube 10 proceeds downstream from the punching station 52 to a second folding station 58, which inwardly folds the opposing side sections 22*a* and 22*b* a second time along with the respective underlying portions of the central section 24. The twice-folded tube 10 is comprised of six layers of plastic material.

To package the interconnected plastic bags formed by the process depicted in FIG. 1, a predetermined number of the interconnected plastic bags may be wound in a roll and placed into a suitable package. Alternatively, the interconnected plsatic bags may proceed to a combination of differential speed rollers that separates the bags along the perforation lines 18 into isolated plastic bags. A predetermined number of the isolated plastic bags may then be interleaved, wound into a roll, and placed into a suitable package, or may be stacked and placed into a suitable package. An isolated plastic bag 60 formed by the process in FIG. 1 is schematically depicted in FIG. 10. The plastic bag 60 includes the pair of handles 54 and 56 formed by the W-shaped incision. Fold lines imparted by the first and second folding stations 20 and 58 are designated by the reference numerals 62 and 64, respectively.

Figure 6:
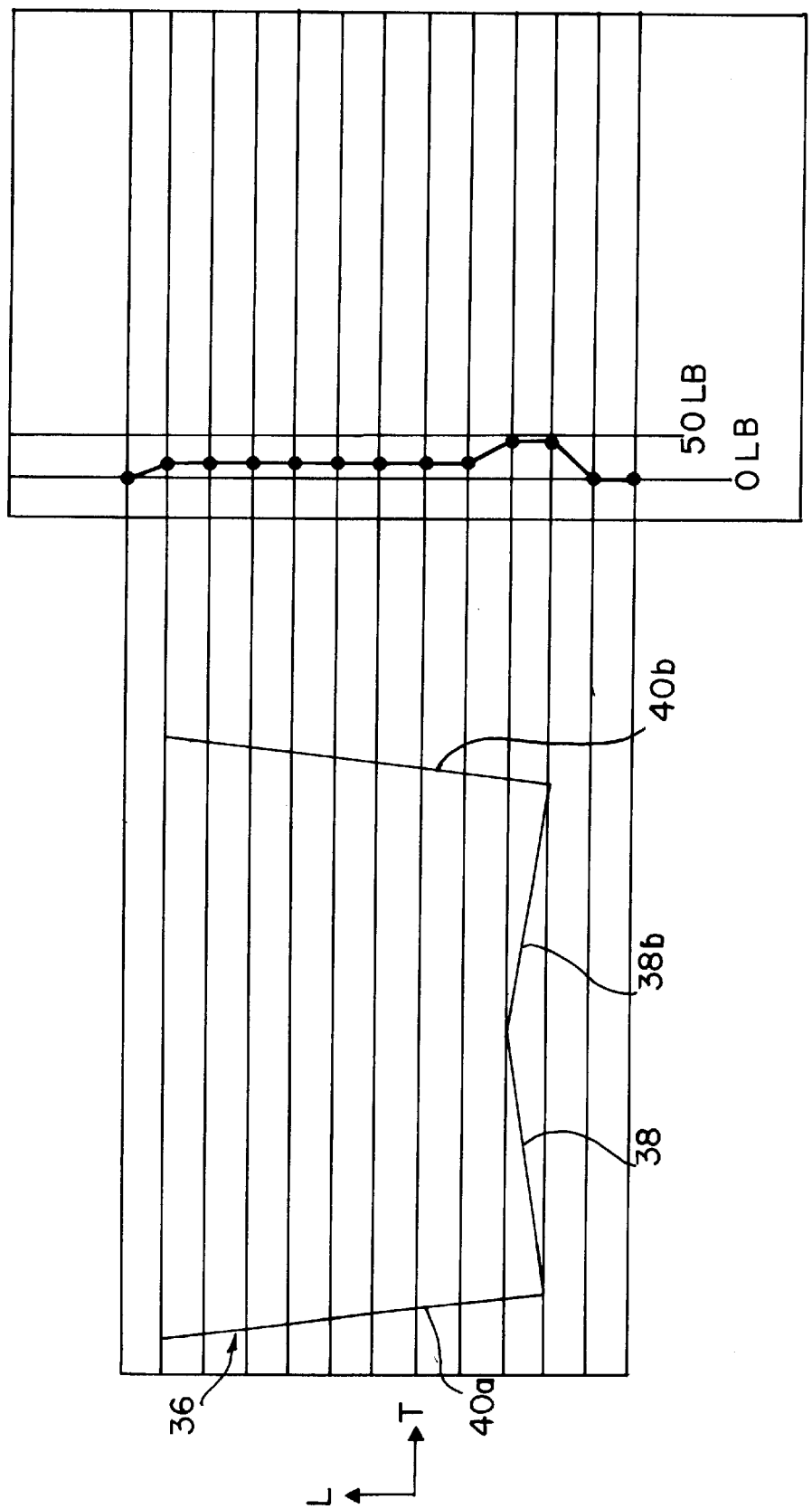
FIG. 6 is a schematic view of a W-shaped blade alongside a graph showing the variation in interference force between the blade and an adjacent rotary anvil.
Figure 8:
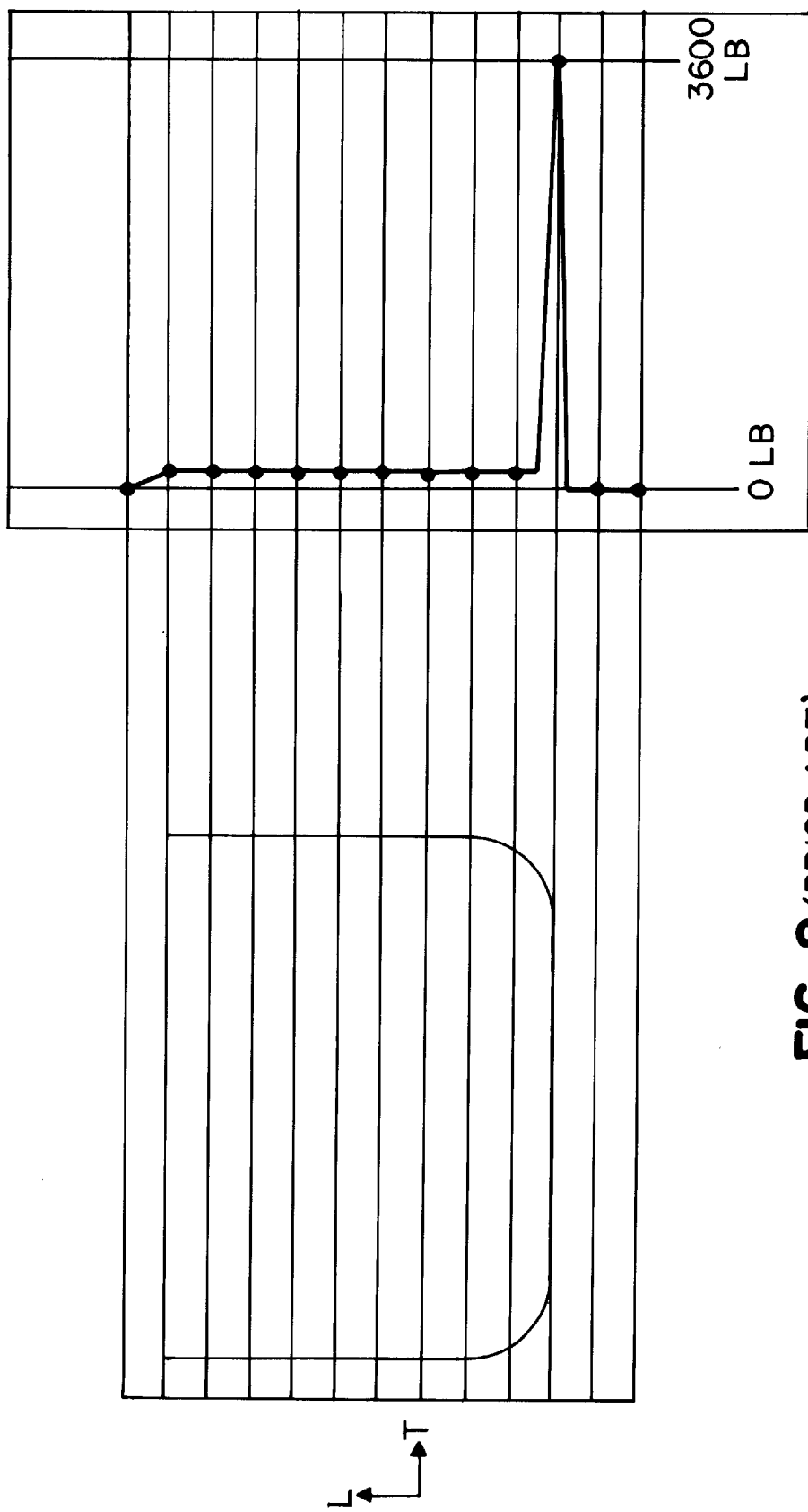
FIG. 8 is a schematic view of a prior art blade alongside a graph showing the variation in interference force between the blade and an adjacent rotary anvil.
Figure 9:
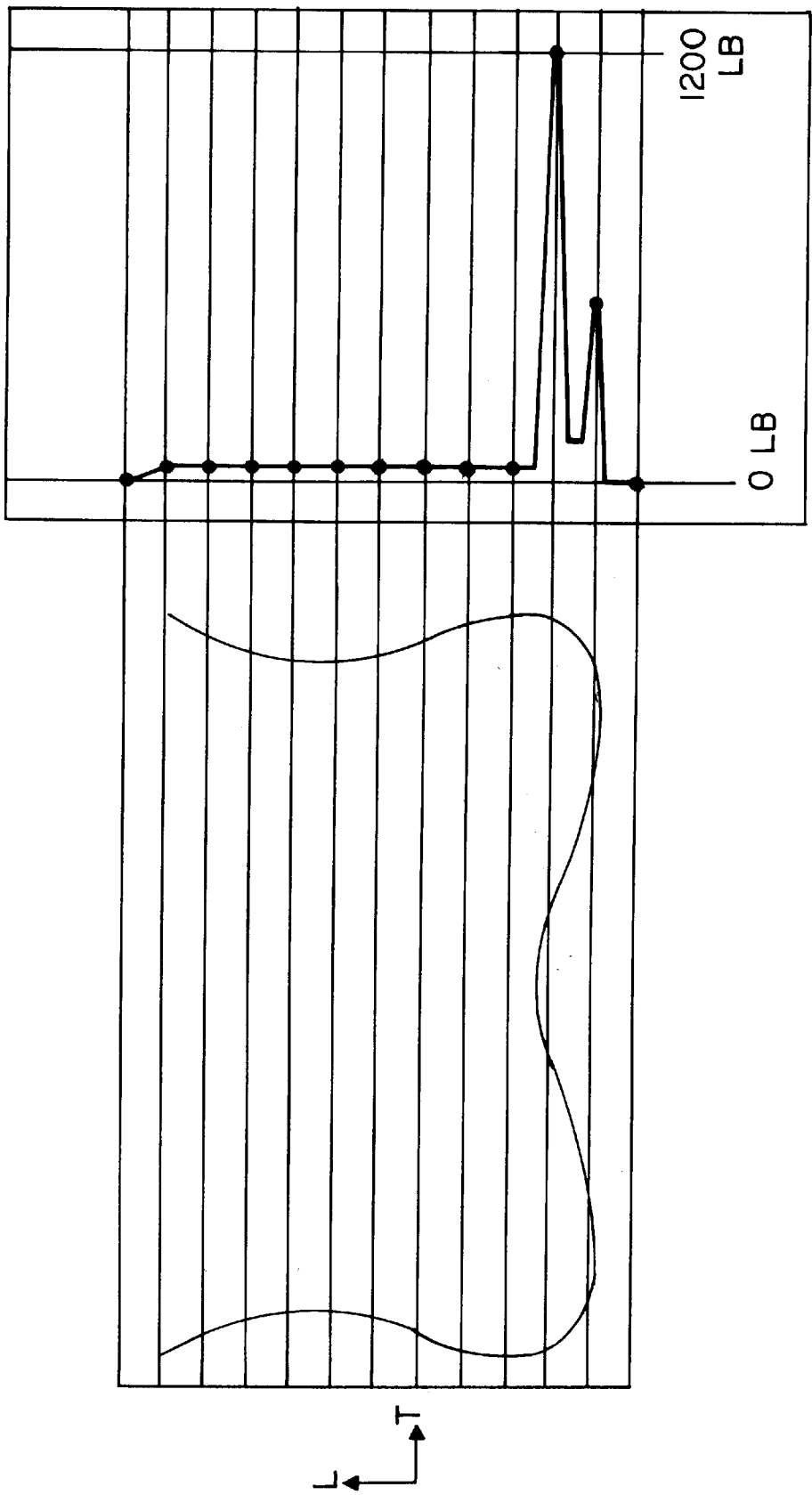
FIG. 9 is a schematic view of another prior art blade alongside a graph showing the variation in interference force between the blade and an adjacent rotary anvil.

Referring back to FIG. 2, a significant advantage of the W-shaped blade design of the rotary cutting die 30 is that, relative to the prior art blade designs in FIGS. 8 and 9, it reduces the difference between the maximum and minimum interference force between the blade 36 and the rotary anvil 28 during a single cutting cycle of the blade 36. This difference is depicted in FIG. 6, which schematically illustrates the W-shaped blade 36 alongside a graph showing the variation in interference force between the blade 36 and the adjacent rotary anvil 28. As a plastic bag travels in the machine direction L between the blade 36 and the rotary anvil 28, the interference force remains close to zero because, at any given moment in time, only a small area of the blade 36 is contacting the rotary anvil 28. Even while the base portion 38*a–b* of the blade 36 is contacting the rotary anvil 28, the area of the blade 36 contacting the rotary anvil 28 at any given moment in time remains quite small. The interference force never increases above approximately 50 pounds, which is significantly smaller than the peak interference forces associated with the prior art blade designs in FIGS. 8 and 9. The significant reduction in the maximum interference force relative to the prior art blade designs allows the blade 36 to effectively withstand the maximum interference force, thereby minimizing wear on the blade 36 and providing less constraints on the processing speeds of the system in FIG. 1.

Figure 7:
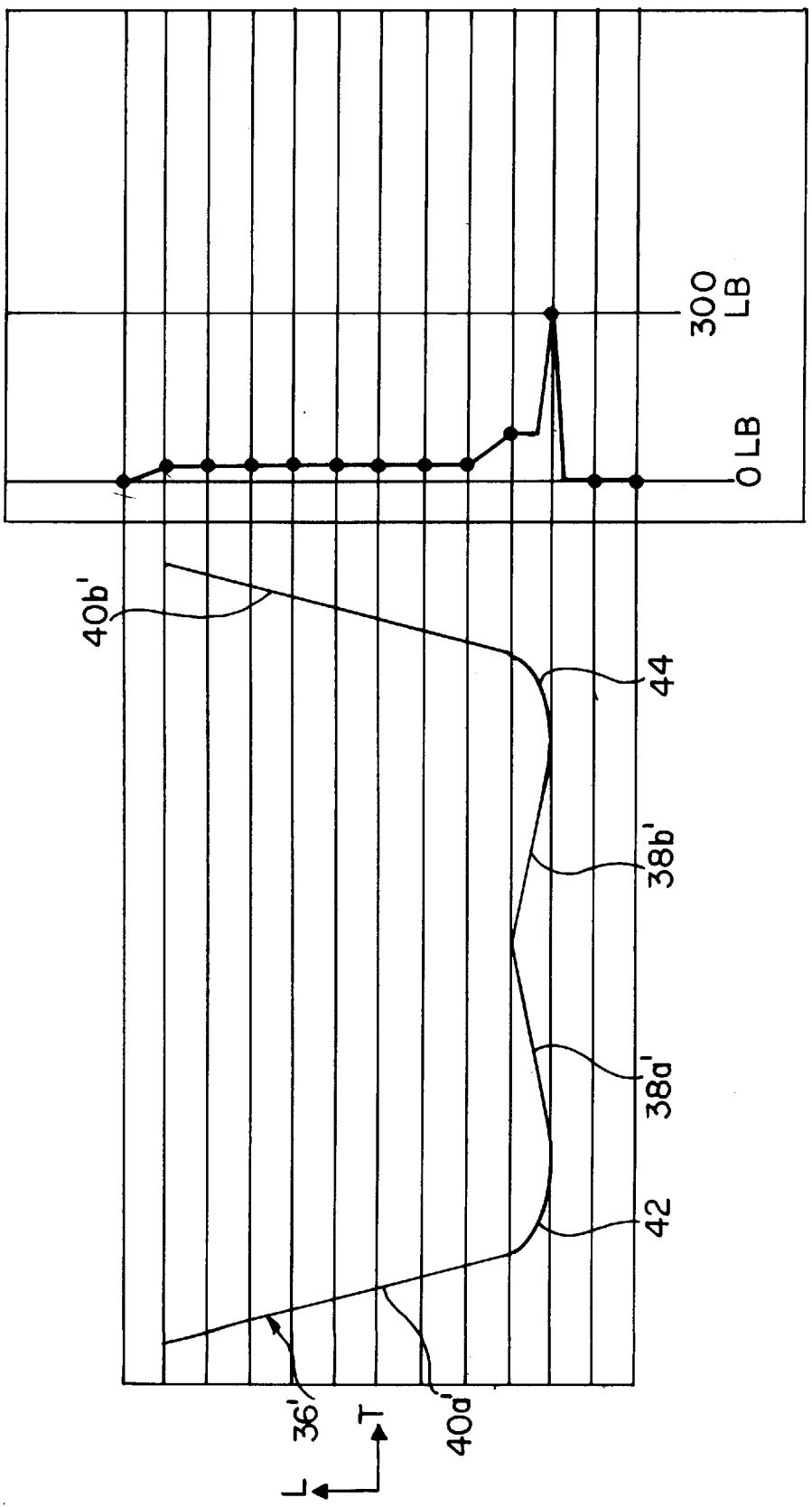
FIG. 7 is a schematic view of a rounded W-shaped blade alongside a graph showing the variation in interference force between the blade and an adjacent rotary anvil.

Like the W-shaped blade design in FIG. 6, the rounded W-shaped blade design in FIG. 7 significantly reduces the difference between the maximum and minimum interference force between the blade 36' and the rotary anvil 28 during a single cutting cycle of the blade 36'. The maximum interference force associated with the rounded W-shaped blade design is approximately 300 pounds, which is still significantly less than the peak interference forces associated with the prior art blade designs in FIGS. 8 and 9. If the amount of contact between the blade 36' and the adjacent rotary anvil 28 at a given time is defined as the contact area, the maximum interference force of approximately 300 pounds translates to a ratio of the maximum-to-minimum contact area that is no greater than about 25:1.

Another significant advantage of the W-shaped blade design is that it extends the life of the rotary anvil 28. As stated above, in the prior art U-shaped blade design, the legs of the U-shaped blade are perpendicular to the base portion, thereby causing a groove in the adjacent rotary anvil as the cutting process progresses. In contrast, the legs of the W-shaped blade 36 are slanted away from each other. As a result, contact between the legs and the adjacent rotating anvil 28 is not narrowly confined to a groove. Rather, the legs of the W-shaped blade 36 distribute their contact to a wider surface area on the rotating anvil 28. The life of the anvil 28 is extended by a magnitude proportional to the angle at which the legs of the blade 36 are slanted away from each other.

Figure 13:
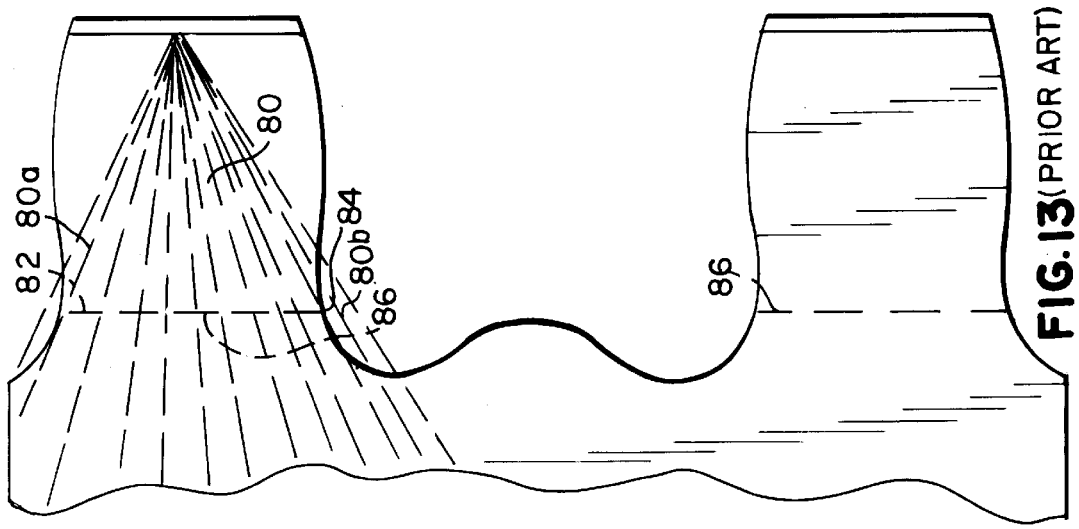
FIG. 13 is a plan view, in schematic form, of the handle region of a prior art plastic bag made with the prior art blade in FIG. 9 and showing stress lines passing through one of the handles.
Figure 12:
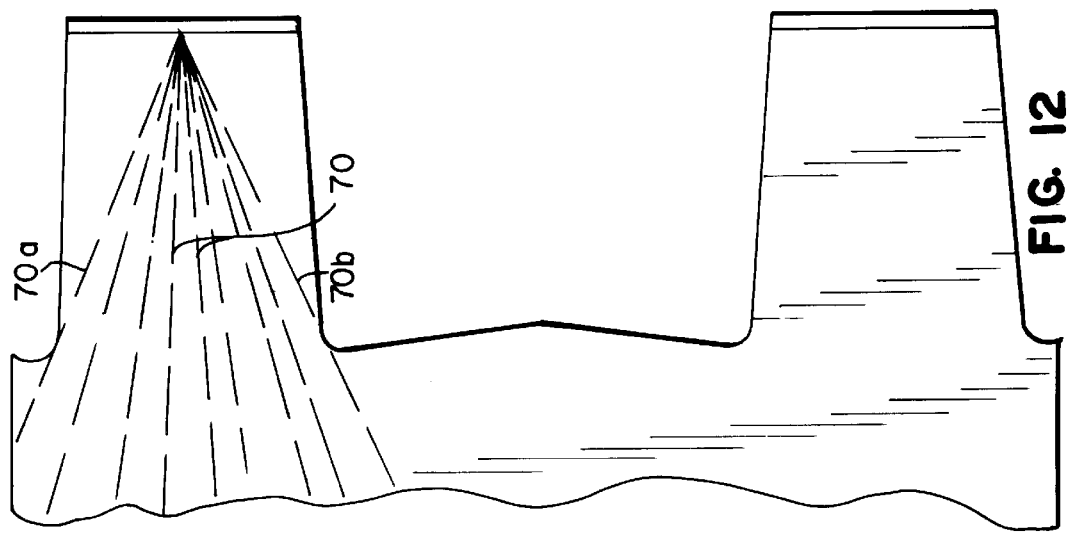
FIG. 12 is a plan view, in schematic form, of the handle region of a plastic bag made with the rounded W-shaped blade in FIG. 7 and showing stress lines passing through one of the handles.
Figure 11:
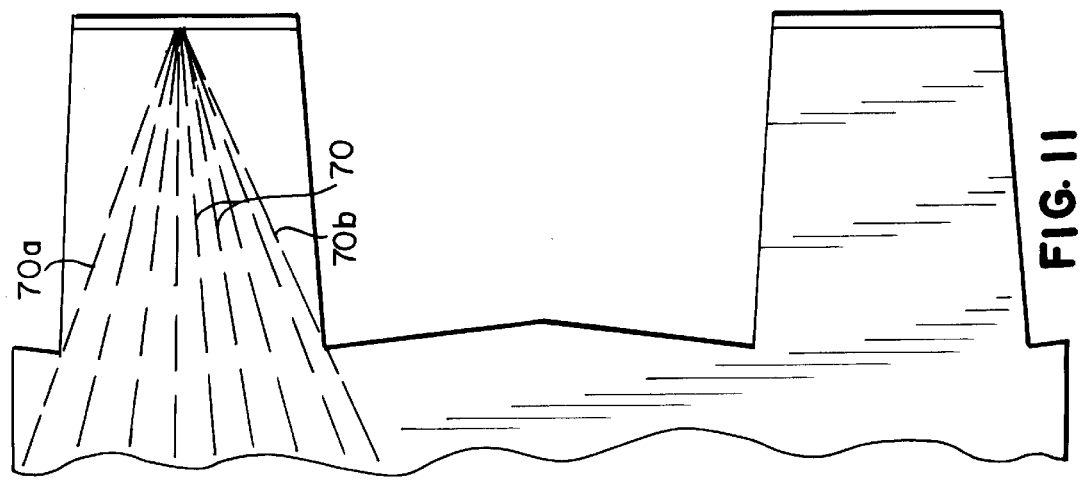
FIG. 11 is a plan view, in schematic form, of the handle region of the plastic bag in FIG. 10 showing stress lines passing through one of the handles.

A further advantage of the W-shaped blade design is that the plastic bags formed by that design are less susceptible to tearing in the handle region than the plastic bags formed by the prior art blade design depicted in FIGS. 9 and 13. Referring to FIGS. 11 and 12, when the plastic bag formed by either the straight W-shaped design (FIG. 11) or the rounded W-shaped blade design (FIG. 12) is loaded with a product and then carried by its handles, the handles are stressed in a manner represented by the stress lines 70. These stress lines originate from the upper ends of the handles and diverge as they travel downward through the handles. The stress lines are such that the outermost ones 70a and 70b thereof are strictly confined to the handles. Such confinement of the stress lines to the handles minimizes the possibility of a tear developing in the handle region. In contrast, as stated previously, the outermost stess lines 80a and 80b of the plastic bag formed by the prior art blade design in FIG. 13 are not confined to the handles, thereby making the handles more susceptible to tearing along tear lines 86.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An apparatus for forming handles in a plurality of interconnected plastic bags traveling in a longitudinal direction, said plastic bags being interconnected along transverse lines of weakness spaced at bag-length distances apart, said apparatus comprising:

a rotary anvil having a first axis of rotation; and a rotary cutting die disposed adjacent to said rotary anvil and having a second axis of rotation substantially parallel to said first axis of rotation, said rotary cutting die including a rotatable cylindrical shaft, a blade shell mounted on said shaft, and a generally W-shaped blade formed on said blade shell, said blade having a base portion and a pair of substantially linear opposing legs, said base portion having an inverted, V-shaped configuration, said opposing legs extending upwardly relative to said base portion and outwardly relative to each other, said opposing legs being coupled to said base portion via transition portions, said blade cutting and thereby forming a pair of handles in each of said plastic bags in response to passing said plastic bags between said rotary anvil and said rotary cutting die.

2. The apparatus of claim 1, wherein a cross-section of said blade includes a trapezoidally-shaped upper portion and rectangularly-shaped lower portion.

3. The apparatus of claim 1, wherein an amount of contact between said blade and said rotary anvil at a given time is defined as contact area, said contact area varying between a minimum and a maximum as the pair of handles are formed on said one of said plastic bags, a ratio of said maximum contact area to said minimum contact area being no greater than about 25:1.

4. The apparatus of claim 1, wherein said transition portions are curved.

5. The apparatus of claim 1, wherein said transition portions are sharp.

6. The apparatus of claim 1, wherein an interference force between said rotary cutting die and said rotary anvil produces a maximum interference force and a minimum interference force, said generally W-shaped blade reducing the difference between said maximum and minimum interference force to no greater than about 300 pounds.

7. An apparatus for forming handles in a plurality of interconnected plastic bags traveling in a longitudinal direction, said plastic bags being interconnected along transverse lines of weakness spaced at bag-length distances apart, said apparatus comprising:

a rotary anvil having a first axis of rotation; and a rotary cutting die disposed adjacent to said rotary anvil and having a second axis of rotation substantially parallel to said first axis of rotation, said rotary cutting die including a rotatable cylindrical shaft and a generally W-shaped blade mounted to said shaft, said blade having a base portion and a pair of substantially linear opposing legs, said base portion having an inverted, V-shaped configuration, said opposing legs extending upwardly relative to said base portion and outwardly relative to each other, said opposing legs being coupled to said base portion via transition portions, said blade cutting and thereby forming a pair of handles in each of said plastic bags in response to passing said plastic bags between said rotary anvil and said rotary cutting die.

8. The apparatus of claim 7, wherein an interference force between said rotary cutting die and said rotary anvil produces a maximum interference force and a minimum interference force, said generally W-shaped blade reducing the difference between said maximum and minimum interference force to no greater than about 300 pounds.

9. A method of forming plastic bags, comprising the steps of:

provising a collapsed tube of thermoplastic film traveling in a longitudinal direction;

forming pairs of closely-spaced, parallel transverse heat seals at bag-length distances apart;

forming transverse lines of weakness between each of said pairs of transverse heat seals such that said collapsed tube includes a plurality of handleless bags interconnected along said transverse lines of weakness; and passing each of said handleless plastic bags between a rotary anvil and a rotary cutting die to form a pair of handles in each of said bags, said rotary anvil having a first axis of rotation, said rotary cutting die disposed adjacent to said rotary anvil and having a second axis of rotation substantially parallel to said first axis of rotation, said rotary cutting die including a rotatable cylindrical shaft, a blade shell mounted on said shaft, and a generally W-shaped blade formed on said blade shell, said blade having a base portion and a pair of substantially linear opposing legs, said base portion having an inverted, V-shaped configuration, said opposing legs extending upwardly relative to said base portion and outwardly relative to each other, said opposing legs being coupled to said base portion via transition portions, said blade creating a generally W-shaped incision in each of said handleless bags.

10. The method of claim 9, wherein said lines of weakness are lines of perforations.

11. The method of claim 9, wherein said W-shaped incision includes opposing legs intersecting said line of weakness in each of said bags at two points of intersection.

12. The method of claim 9, wherein said lines of weakness are weaker between said two points of intersection than outside said two points of intersection.

13. The method of claim 9, wherein said collapsed tube of thermoplastic film includes a pair of opposing side sections and a central section extending between said side sections, and further including the step of folding said side sections inward prior to said step of passing each of said handleless plastic bags between said rotary anvil and said rotary cutting die, said generally W-shaped blade cutting through inner portions of said respective folded side sections and said central section.

14. The method of claim 9, wherein a cross-section of said blade includes a trapezoidally-shaped upper portion and rectangularly-shaped lower portion.

15. The method of claim 9, wherein an amount of contact between said blade and said rotary anvil at a given time is defined as contact area, said contact area varying between a minimum and a maximum as the pair of handles are formed on said one of said plastic bags, a ratio of said maximum contact area to said minimum contact area being no greater than about 25:1.

16. The method of claim 9, wherein said transition portions are curved.

17. The method of claim 9, wherein said transition portions are sharp.

18. The method of claim 9, wherein an interference force between said rotary cutting die and said rotary anvil produces a maximum interference force and a minimum interference force, said generally W-shaped blade reducing the difference between said maximum and minimum interference force to no greater than about 300 pounds.

19. A method of forming plastic bags, comprising the steps of:

providing a collapsed tube of thermoplastic film traveling in a longitudinal direction;

forming pairs of closely-spaced, parallel transverse heat seals at bag-length distances apart;

forming transverse lines of weakness between each of said pairs of transverse heat seals such that said collapsed tube includes a plurality of handleless bags interconnected along said transverse lines of weakness; and passing each of said handleless plastic bags between a rotary anvil and a rotary cutting die to form a pair of handles in each of said bags, said rotary anvil having a first axis of rotation, said rotary cutting die disposed adjacent to said rotary anvil and having a second axis of rotation substantially parallel to said first axis of rotation, said rotary cutting die including a rotatable cylindrical shaft and a generally W-shaped blade mounted to said shaft, said blade having a base portion and a pair of substantially linear opposing legs, said base portion having an inverted, V-shaped configuration, said opposing legs extending upwardly relative to said base portion and outwardly relative to each other, said opposing legs being coupled to said base portion via transition portions, said blade creating a generally W-shaped incision in each of said handleless bags.

20. The method of claim 19, wherein an interference force between said rotary cutting die and said rotary anvil produces a maximum interference force and a minimum interference force, said generally W-shaped blade reducing the difference between said maximum and minimum interference force to no greater than about 300 pounds.

* * * * *